United States Patent Office 3,250,116
Patented May 10, 1966

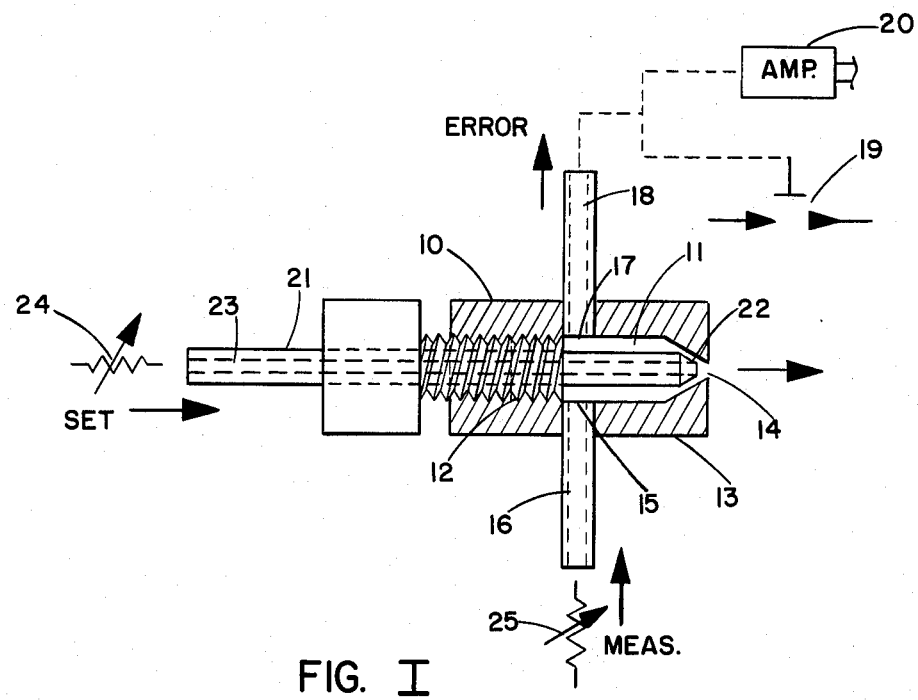
FIG. I
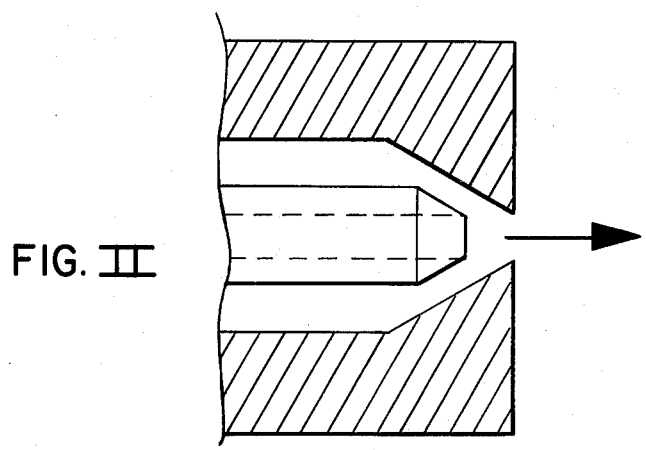
FIG. II

---

3,250,116
FLUID DETECTOR BY ENTRAINMENT
Richard W. Hatch, Jr., Norwell, Mass., assignor to The Foxboro Company, Foxboro, Mass., a corporation of Massachusetts
Filed June 15, 1964, Ser. No. 374,906
1 Claim. (Cl. 73—37.5)

This invention relates to fluid dynamic devices and has particular reference to a fluid operator based on entrainment. This device is primarily thought of as a controller unit or operator wherein set point is compared to a measurement and an error signal is obtained.

This is a dynamic continuous flow device which is quite small and very sensitive.

It is very useful in low fluid flow situations, it has essentially no hysteresis in its action, and it is ultra-simple. There are no moving parts and it is a true solid-state device in the sense that it is not a force balance.

It provides a proportional output which may be applied in some forms as an on-off device.

The main body of this device has an entrainment passage with a jet therein, wherein the entrainment passage has side ports. In terms of the control the measurement is put into one of these ports, the output signal is taken from the other and the set point is applied to the nozzle.

It is therefore an object of this invention to provide a new and useful fluid dynamic device in the form of an entrainment error detector.

Other objects and advantages of this invention will be in part apparent and in part pointed out hereinafter and in the accompanying drawings, wherein:

FIGURE I of the drawing is an illustration of a main body of this device with associated showings of input and output factors; and FIGURE II is an enlarged view of the nozzle portion of the device.

Referring to FIGURE I, the main body of the operator is indicated at 10 and is generally in a cylindrical form with a cylindrical coaxial opening therethrough indicated at 11. At the left hand portion of this opening is a threaded formation as at 12 and the main body of the right hand portion is an entrainment aspiration chamber 13 terminating in a jet opening 14.

The entrainment chamber 13 is provided with an input 15 with a measured signal supply passage thereto at 16. There is also an error signal output port 17 from which a signal is carried through an output passage 18 to a fluid logic diffusion on-off unit 19 or a proportional amplifier in the device 20, or both, as desired. A jet member generally indicated at 21 is inserted into the main body 10 so that the jet end 22 is close to the jet opening 14 and within the entrainment chamber 13. The jet member 21 is threaded into the threaded portion 12 of the main body and may be variably adjusted in and out to give a different jet action as desired.

The jet passage 23 is used to apply a set point signal through the unit to the nozzle. A variable restrictor 24 may be used to establish a different set point value as desired.

The measured signal input signal 16 is also applied thereto through a variable restrictor 25. This is a balancing restrictor and is adjusted prior to operation and held in fixed position during operation.

In the operation of this device, a set point signal is applied to the jet, and a measurement signal applied to the measurement input 16. As the jet aspirates or entrains fluid from the chamber 13, if the measurement is equated to the set point, the amount of the entrained fluid is supplied by the input measurement signal and the output is zero in the passage 18. If the measurement is less than the set point the output is negative as a measure of vacuum. If the measurement is greater than the set point, the output is positive in the passage 18. Thus the entrainment compares the set point signal with the measured signal to produce an error signal.

When a set point flow is established through the entrainment chamber, by means of the pipe extending thereinto, to the nozzle-like opening in the main body, this flow will entrain out through the nozzle end, fluid to the amount, from the measurement, which would equate to the amount entrained if there were no measurement supply.

When the measurement is low the entrainment causes a form of vacuum in the output and the error is negative. When the measurement is high, there is an excess and the entrainment doesn't take it all out, so there is a positive error in the output pipe.

In this device there may be multiple input signal ports so that it would require the sum of all these measured signals to achieve the set point value according to the entrainment. The output in this case may also be multiple. Each output will be identical in value. The inputs may be in any fashion variety of signal values as long as their sum achieves the entrainment value to produce a zero error signal in a summing action.

This invention therefore provides a new and useful fluid dynamic device based on entrainment.

As many embodiments may be made of the above invention, and as changes may be made in the embodiments set forth above without departing from the scope of the invention, it is to be understood that all matter hereinbefore set forth or shown in the accompanying drawings is to be interpreted as illustrative only and not in a limiting sense.

I claim:

A control fluid operator by nozzle entrainment wherein a nozzle within a chamber directs a jet partly through said chamber and out through an adjacent opening in said chamber to atmosphere in an operating situation which introduces no back pressure variants to said operator at any one fluid flow condition through said jet, said operator comprising an entrainment chamber, a jet exit opening in said chamber adjacent said jet, an input jet extending into said chamber to terminate close to said jet exit opening and directing a jet flow through said exit opening such as to produce aspirating action in said chamber, means for adjusting the flow through said input jet for introducing a control set point signal into said chamber, means for introducing into said chamber, a fluid flow proportional to a control measurement, and a control error signal take-off from said chamber, whereby said error signal is zero when the amount of said fluid aspiration from said chamber is matched and balanced by fluid entered into said chamber as a measurement signal through said control measurement signal input.

(References on following page)

References Cited by the Examiner

UNITED STATES PATENTS

| | | | |
|---|---|---|---|
| 2,692,498 | 10/1954 | Knobel | 73—37.9 X |
| 2,907,337 | 10/1959 | Bemporad. | |
| 3,154,810 | 11/1964 | Horne | 73—37.7 X |
| 3,176,502 | 4/1965 | Cizek | 73—37.5 |

FOREIGN PATENTS

| | | |
|---|---|---|
| 879,466 | 6/1953 | Germany. |
| 442,365 | 2/1936 | Great Britain. |

LOUIS R. PRINCE, *Primary Examiner.*

FRANK H. THOMSON, *Assistant Examiner.*